April 24, 1956     D. P. SHOW     2,742,923
TEMPERATURE REGULATING SHOWER VALVE

Filed June 20, 1951     2 Sheets-Sheet 1

INVENTOR
DONOVAN P. SHOW

BY *Gustav Miller*
ATTORNEY

April 24, 1956 D. P. SHOW 2,742,923
TEMPERATURE REGULATING SHOWER VALVE
Filed June 20, 1951 2 Sheets-Sheet 2
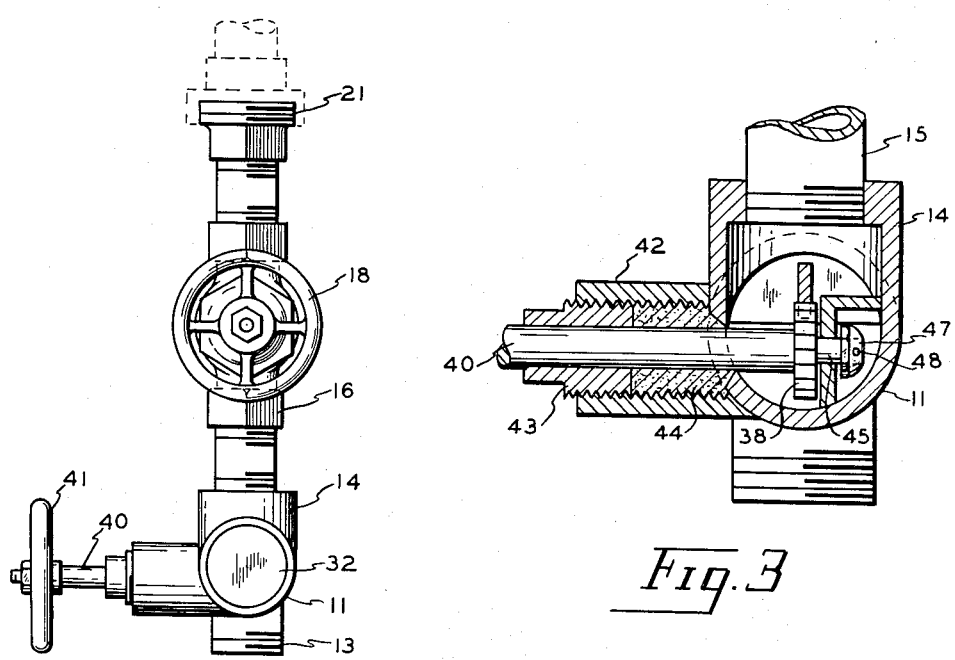
Fig.2
Fig.3
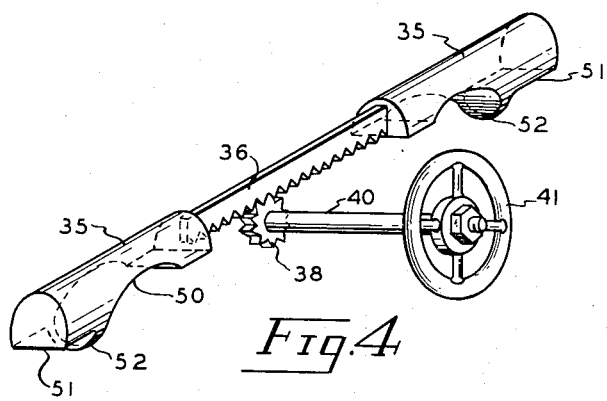
Fig.4
*INVENTOR*
DONOVAN P. SHOW
BY *Tristan Mille*
ATTORNEY

United States Patent Office

2,742,923
Patented Apr. 24, 1956

2,742,923
TEMPERATURE REGULATING SHOWER VALVE

Donovan P. Show, Richmond, Calif.

Application June 20, 1951, Serial No. 232,587

1 Claim. (Cl. 137—625.4)

This invention relates to a temperature regulating shower valve and has for an object to provide a new and simple apparatus for regulating the temperature of the water to a shower head or to a water faucet or other water outlet.

A further object of this invention is to provide an apparatus for combining two separate streams of hot and cold water into a single stream of water having the desired temperature and to then control the flow of water at the desired temperature by operating one volume control valve only instead of the usual two valves.

A further object of this invention is to provide a temperature regulating valve wherein the temperature of a stream of water is controlled by regulating the supply of water from a hot stream and from a cold stream by means of a separate valve controlling each stream of water and wherein such separate valves are simultaneously controlled by a single control wheel for setting up the desired temperature of the resulting stream which resulting stream is controlled by a singe control wheel so that after the temperature is regulated as desired, the temperature regulating control wheel may thereafter be left untouched and only the volume control valve need be operated to the desired pressure and the water will always be at the same desired temperature as long as the temperature of the incoming streams of hot and cold water remain constant.

A further object of this invention is to provide a mixing chamber for thoroughly blending a single mixed stream of hot and cold water and assuring that the stream of water reaching a shower head or other outlet will be free of any cold and hot streaks therein.

Yet a further object of this invention is to provide a water temperature regulating apparatus wherein separate streams of hot and cold water are led to a single outlet and wherein separate valves at the inlet for the hot and cold water streams are operated simultaneously but oppositely by a single manual control means in a straight line direction, and wherein such hot and cold water control valves may be of separate types, including a piston and cylinder type.

A further object of this invention is to provide a single manually operatable control means for simultaneously but oppositely controlling the operation of two spaced apart valves in a hot and in a cold water pipe so that either valve will open or close simultaneously with the closing or opening of the other valve.

With the foregoing and other objects in view, this invention comprises the combination, construction and arrangement of parts hereinafter set forth, claimed and disclosed in the accompanying drawings, wherein:

Fig. 2 is an end view of part of Fig. 1 looking in the direction of arrow 2 of Fig. 1.

Fig. 3 is a sectional view on line 3—3 of Fig. 1.

Fig. 4 is a prospective view of the piston valves of Fig. 1.

Figure 1:
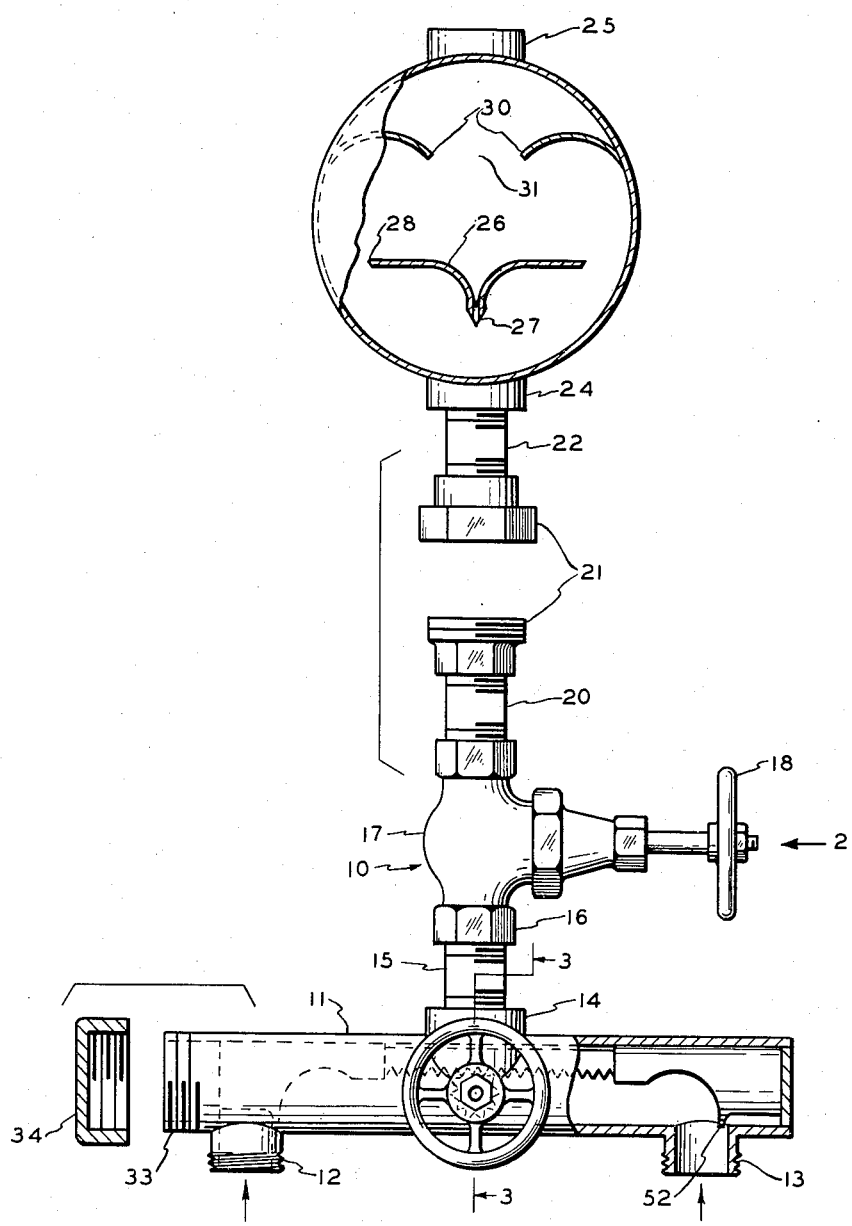
Fig. 1 is a plan view properly in section of one complete form of this invention.

There is shown at 10 the temperature regulating valve of this invention particularly intended for use as a shower valve but obviously equally usable for use with any type of water dispensing valve such as a faucet in a sink or elsewhere.

In Figs. 1 to 4 inclusive, the temperature regulating valve of this invention is shown as including a cylindrical valve housing 11 having spaced apart inlet ports 12 and 13 adjacent opposite ends thereof suitably threaded or otherwise suitably arranged so that hot and cold water pipes may be secured thereto. Midway on the cylindrical housing 11 between ports 12 and 13 there is provided an outlet port 14 here shown as connected by nipple 15 and inlet 16 to a volume control globe valve 17 having manually operatable valve wheel 18. As shown, the outlet side of globe valve 17 is provided with a nipple 20 for connection by a union 21 and nipple 22 to a mixing chamber 23 having an inlet 24 at one side connected to nipple 22 and an outlet port 25 at the opposite side which may be connected by suitable plumbing to a shower head or other type of water dispensing faucet or tap.

As shown the mixing chamber 23 consists of a wafer shaped cylinder having a reversely curvilinear U baffle 26 located therein with its apex 27 adjacent the inlet 24 and the ends 28 adjacent the cylindrical side wall but spaced therefrom. A second baffle means consists of a pair of reversely curved baffle plates 30 adjacent the outlet 25, the baffle plates 30 contacting the cylindrical wall but having the passageway 31 between its spaced apart ends so that water or other fluid passing therein at 24 hits the apex 27 of U baffle 26 and then divides to hit the spaced apart baffle plates 30 and be reunited in a thoroughly mixed and blended stream of uniform temperature through passage 31 and outlet 25.

One end of the cylindrical valve housing 11 may be permanently closed as by an end plate 32 while the other end may be threaded at 33 to removedly receive a threaded cap 34. Inserted through the open end of cylindrical valve housing 11 are the piston valves 35 secured together in suitably spaced apart relationship by a connecting rod 36 and provided with a tooth rack 37 along one edge. In mesh with the rack teeth 37 is a gear 38 mounted on a shaft 40 to which is secured the manual wheel 41 for rotating the same and thus controlling the position of the connecting rod 36 and piston valve 35. The shaft 40 extends into the housing 11 through a suitable coupling 42 having a packing nut 43 and a packing gland 44, and is provided with a reduced end 45 journaled through a support 46 which is L shaped as shown and welded within the housing 11. A beveled nut 47 locked in position by the said screw 48 on the reduced end 45 serves to hold the shaft 40 in position.

The bottom of the piston valves 35 is recessed as at 50 to permit the water in their ports 12 and 13 to flow through the cylindrical valve housing 11 toward the outlet port 14. The rear end of each piston valve 35 may also be recessed at 51, the recesses 50 and 51 being separated by a full cylindrical portion 52 which portion 52 serves to completely close off the flow of water from the inlet port when it has reached that side of the port that is nearer to the center of the housing 11 and to the outlet port 14, at which time the other piston valve is in the maximum open position, but the cylindrical portion 52 of the open valve does not pass completely across that inlet port, but instead leaves its recess 51 open to the inlet port 13. As a result, the operation of the manual control wheel 41 in one direction or the other will cause a straight line and simultaneous movement of both piston valves 35, one toward the open position and the other toward the closed position, without causing any vacuum or block between the ends of the piston valves and the closed ends of the cylinder housing, any water in the closed ends flowing freely therein and thereout as a result of the recesses 51.

In operation rotation of the manual control wheel 41 will regulate the temperature of the water by shifting piston valves 35 simultaneously one in an opening direction and the other in a closing direction, the inner valves 12 and 13 thus regulating the amount of hot and cold water that may enter therein into the cylindrical housing 11 and out through the outlet port 14. The volume or pressure of water coming from the outlet 14 may then be controlled by means of the control wheel 18 operating the conventional globe valve 17. To insure that the water delivered to the shower head is thoroughly mixed or blended, the mixing chamber 23 may be provided between the shower head and the volume or pressure control valve 17. Once the desired temperature of the water has been properly regulated by means of the piston valves 35 and manual control wheel 41, it is only necessary to operate the manual control wheel 18 to turn the water on or off or to control the pressure or volume of the water, and the temperature will always remain the same as long as the temperature of the hot and cold water entering through the inlet ports 12 and 13 remains the same. As a result when taking a shower, once the desired temperature has been regulated, the shower may be turned on and off always at the same temperature by manipulating the hand wheel 18. This enables a great saving in water and particularly in hot water during the taking of a shower, for the water may be turned off during the soaping process and then turned on again with assurance that the shower will still remain at the same desired temperature and not have to be readjusted as is conventional nowadays with the usual two separate hot and cold valve controls.

The temperature controlling valves are quick opening and closing, operate in a simultaneous but opposite action in a straight line—to reciprocate one way or the other for simultaneously opening one valve and closing the other valve. Thus, this invention saves much time and bother usually required to adjust the water temperature prior to taking a shower and particularly during the taking of a shower, and enables the water to be turned on and off with only one original setting to always obtain the proper temperature immediately. Thereafter only one valve has to be operated to take a shower, that is the valve regulating the pressure or volume; and there is provided constant flow of water from the shower head that is free of cold streaks; eliminating the dangerous possibility of getting scalded as exists in the conventional shower head.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A temperature regulating and mixing valve comprising an elongated cylindrical housing having one open end and one closed end, a screw cap removably closing said open end, a pair of inlet ports in one side of said housing one each disposed a spaced distance from each end thereof, an outlet port in the other side of said housing disposed substantially midlength thereof, a pair of cylindrically shaped pistons slidably disposed one each over each of said pair of ports in said housing, an elongated connecting rod in said housing between said pair of pistons and having its ends connected one each to each of said pair of pistons on the inner end of each and at the top edge thereof, a toothed rack on said connecting rod on the lower face thereof, said toothed rack being disposed in said housing substantially at the centers of the ends of said pair of pistons, means including a gear engageable with said toothed rack operable to move said pair of pistons alternatingly over said pair of ports, each of said pair of pistons being formed on its side adjacent its associated one of said pair of ports with a recess opening into the inner end of said piston and forming a passage in said housing between said outlet port and its associated one of said pair of ports when positioned over that port, said pair of pistons each being formed with a full cylindrical wall substantially midlength thereof operable to close said passage when positioned inwardly of one of said pair of ports, and second recesses on each of said pair of pistons on the outer ends thereof each connecting the adjacent one closed end of said housing with the adjacent one of said pair of ports when its associated one of said pair of pistons is moved inwardly from said one end, said pair of ports being adapted and arranged to be connected one each to a supply of hot and a supply of cold water.

References Cited in the file of this patent

UNITED STATES PATENTS

| | | |
|---|---|---|
| 866,122 | Foster | Sept. 17, 1907 |
| 993,806 | Taylor | May 30, 1911 |
| 1,948,044 | Myers | Feb. 20, 1934 |
| 2,011,329 | Wayer | Aug. 13, 1935 |
| 2,038,943 | La Fountain | Apr. 28, 1936 |
| 2,238,374 | Sallee | Apr. 15, 1941 |
| 2,511,291 | Mueller | June 13, 1950 |

FOREIGN PATENTS

| | | |
|---|---|---|
| 417,424 | Great Britain | 1934 |
| 934,421 | France | 1948 |